(12) United States Patent
Tsai et al.

(10) Patent No.: US 7,738,901 B2
(45) Date of Patent: Jun. 15, 2010

(54) SECONDARY LINK POWER CONTROL IN A WIRELESS COMMUNICATION NETWORK

(75) Inventors: Shiau-He Shawn Tsai, San Diego, CA (US); Young C. Yoon, San Diego, CA (US); Tao Wu, Carlsbad, CA (US); Anthony C. K. Soong, Superior, CO (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 1402 days.

(21) Appl. No.: 10/788,568

(22) Filed: Feb. 27, 2004

(65) Prior Publication Data

US 2005/0009551 A1    Jan. 13, 2005

Related U.S. Application Data

(60) Provisional application No. 60/486,157, filed on Jul. 10, 2003.

(51) Int. Cl.
*H04B 7/00* (2006.01)

(52) U.S. Cl. .................................. 455/522; 455/69

(58) Field of Classification Search ................ 455/68, 455/69, 517, 522, 67.11
See application file for complete search history.

(56) References Cited

U.S. PATENT DOCUMENTS

| | | | |
|---|---|---|---|
| 5,487,072 A | | 1/1996 | Kant |
| 5,546,411 A | | 8/1996 | Leitch et al. |
| 5,931,964 A | | 8/1999 | Beming et al. |
| 6,173,162 B1 | | 1/2001 | Dahlman et al. |
| 6,434,367 B1 * | | 8/2002 | Kumar et al. ................ 455/70 |
| 6,512,927 B2 * | | 1/2003 | Hunzinger ............... 455/452.1 |
| 6,594,501 B2 * | | 7/2003 | Black et al. ................. 455/522 |
| 6,735,216 B2 * | | 5/2004 | Chen et al. .................. 370/441 |
| 6,850,771 B2 * | | 2/2005 | Malladi et al. .............. 455/522 |
| 6,937,584 B2 * | | 8/2005 | Chaponniere et al. ....... 370/335 |
| 6,993,294 B2 * | | 1/2006 | Nobukiyo et al. ........ 455/67.11 |
| 2002/0027495 A1 | | 3/2002 | Darby, Jr. et al. |
| 2002/0080719 A1 * | | 6/2002 | Parkvall et al. ............. 370/235 |
| 2002/0167907 A1 * | | 11/2002 | Sarkar et al. ................ 370/335 |
| 2002/0172192 A1 * | | 11/2002 | Hunzinger et al. .......... 370/352 |
| 2003/0002460 A1 | | 1/2003 | English |
| 2003/0002461 A1 | | 1/2003 | Chaponniere et al. |
| 2003/0050084 A1 * | | 3/2003 | Damnjanovic et al. ...... 455/522 |
| 2003/0114180 A1 | | 6/2003 | Black et al. |
| 2004/0160922 A1 * | | 8/2004 | Nanda et al. ................ 370/335 |
| 2004/0160933 A1 * | | 8/2004 | Odenwalder et al. ........ 370/342 |

FOREIGN PATENT DOCUMENTS

EP    0406741    1/1991

(Continued)

*Primary Examiner*—Quochien B Vuong
(74) *Attorney, Agent, or Firm*—Coats & Bennett, P.L.L.C.

(57) ABSTRACT

A communication transceiver transmits a power-controlled first signal responsive to received power control commands and transmits one or more additional signals at variable power gains relative to the transmit power of the first signal based on reception quality feedback received for the additional signals. Thus, a mobile station may transmit a traffic channel at a variable power gain relative to its pilot signal power and vary that gain responsive to reception quality feedback received by it for the traffic signal. Of course, the mobile station may float more than one traffic channel using variable gains and may use different variable gains for each one. Further, the mobile station may float one or more non-pilot channels relative to the pilot or relative to another channel, while transmitting one or more fixed gain channels. Similar variable power gain may be employed at network base stations for forward link signals.

52 Claims, 5 Drawing Sheets

FOREIGN PATENT DOCUMENTS

| | | |
|---|---|---|
| EP | 0 984 582 | 8/1999 |
| EP | 1 215 833 | 6/2002 |
| EP | 1304900 A2 | 4/2003 |
| JP | 10-013338 | 1/1998 |
| KR | 2003000007 | 1/2003 |
| WO | WO 99/59355 | 5/1999 |
| WO | WO 02/47402 | 6/2002 |
| WO | 03/039042 A1 | 5/2003 |

* cited by examiner

SECONDARY LINK POWER CONTROL IN A WIRELESS COMMUNICATION NETWORK

RELATED APPLICATIONS

This application claims priority under 35 U.S.C. §119(e) from the following provisional application: Application Ser. No. 60/486,157 filed on Jul. 10, 2003. That application is incorporated in its entirety by reference herein.

BACKGROUND OF THE INVENTION

The present invention generally relates to wireless communication networks, and particularly relates to power control in such networks.

Wireless communication networks typically employ some form of closed-loop power control for the communication signals going between base stations and the mobile stations being supported by those base stations. In particular, the typical Code Division Multiple Access (CDMA) network uses forward and reverse link power controls to control transmission powers by base stations on the forward link and by mobile stations on the reverse link. For example, network base stations must receive signals on the reverse link from mobile stations at signal strengths sufficient to permit data reception at tolerable error rates. However, to reduce each mobile station's contribution to overall reverse link interference, the network controls each mobile station such that it on average transmits at no higher power than is required to achieve the targeted received signal strength at one or more network base stations.

In a typical approach, the network employs both "inner" and "outer" loop reverse link power control. Inner loop power control involves relatively fast, ongoing power control adjustments of the mobile station's reverse link transmit power by the network. For example, in CDMA networks configured according to IS-2000 standards, inner loop control is based on the network streaming power control commands to the mobile station at up to 800 Hz, i.e., one power control command every 1.25 ms.

In response to each received command, the mobile station adjusts its pilot signal power upward or downward by a defined incremental step, depending on whether the received command was an up or a down command. A given base station supporting the mobile station determines whether to send an up or a down command based on the signal strength of the mobile station's signal as received at the base station. In particular, the typical base station monitors the received signal strength of the mobile station's pilot signal relative to a target value and sends an up command if the received signal strength is below the target, or sends a down command if the received signal strength is above the target. Because the typical mobile station is configured to transmit all of its reverse link signals, e.g., traffic channel and/or control channel signals, at defined ratios of pilot signal power, the up and down commands from the network cause the mobile station to increase and decrease, respectively, the power, of all its reverse link signal transmissions.

Outer loop reverse link power control runs at a slower rate and involves adjusting the inner loop signal strength target at the base station up or down based on some other reception parameter. Commonly the Frame Error Rate (FER) of the mobile station's traffic channel signal provides the metric for adjusting the inner loop target. For example, if the FER is low compared to a 1% (or other) target error rate, the base station may adjust the inner loop target downward. Conversely, if the FER exceeds the target error rate, the base station may adjust the inner loop target upward. In this manner, the base station's inner loop provides rapid closed-loop control of the mobile station's transmit power to maintain the as-received signal strength of the mobile station's pilot signal at or around a target value, while outer loop control provides a slower adjustment mechanism to ensure that the target value yields tolerable data error rates.

For certain types of forward link channels, e.g., dedicated traffic channels, similar inner and outer loop control mechanisms are embodied at the mobile stations. Thus, a given mobile station streams up/down power control commands to the network based on whether it receives a particular signal, e.g., a traffic channel signal, from the network at a signal strength above or below a target value. Further, the mobile station adjusts the target value up or down based on, for example, a FER of data received on the traffic channel signal.

SUMMARY OF THE INVENTION

The present invention comprises a method and apparatus that provide data link power control based on reception quality feedback, which may comprise some form of good/bad reception indicators. By way of non-limiting examples, the present invention may be used to provide supplemental power control of one or both of the forward and reverse links in a wireless communication network. However, in general, the present invention enables a first communication transceiver to adjust the power gain of a data signal directly or indirectly relative to a pilot or other reference signal transmitted by it based on feedback from one or more remote transceivers regarding reception of the data signal.

Thus, according to the present invention, an exemplary method of data link power control at a communication transceiver comprises controlling a transmit power of a first signal transmitted by the communication transceiver responsive to received power control commands, transmitting a second signal at a controlled power gain relative to the first signal, receiving reception quality feedback relating to the second signal, and adjusting the power gain of the second signal relative to the first signal responsive to the reception quality feedback. The first signal may comprise a pilot signal and the second signal may comprise a data signal, e.g., a traffic channel signal transmitted by a mobile station or a base station in a wireless communication network. Thus, the reception quality feedback generally comprises some form of good/bad reception indicator for data transmitted on the traffic channel signal and thus, for example, may be in the form of ACK/NAK feedback, quality indicator (bit) feedback, and erasure (bit) feedback.

Complementing the above exemplary method, an exemplary communication transceiver comprises transceiver circuits to transmit and receive signals to and from one or more remote transceivers, and one or more processing circuits operatively associated with the transceiver circuits. Exemplary processing circuits include a power control circuit that is configured to control a transmit power of a first signal transmitted by the communication transceiver responsive to power control commands received by the communication transceiver, control a power gain of a second signal transmitted by the communication transceiver relative to the first signal, and adjust the power gain of the second signal relative to the first signal responsive to the reception quality feedback received by the communication transceiver for the second signal.

In an exemplary mobile station embodiment of the present invention, a method of reverse link power control at a mobile station comprises transmitting a traffic channel signal at a defined traffic-to-pilot power ratio, receiving reception quality feedback for the traffic channel signal from one or more network base stations, and adjusting the traffic-to-pilot power ratio as a function of the ACK/NAK feedback. Thus, the present invention in this embodiment works in concert with and supplements the network's ongoing reverse link power control of the mobile station. In an exemplary embodiment, receiving reception quality feedback for the traffic channel signal from one or more network base stations comprises receiving ACK/NAK or other good/bad indicator feedback per transmit frame for the traffic channel signal. (In some forms of feedback, the absence of a bad reception indicator is taken as an implicit indication of good reception.) Further, an exemplary adjustment method comprises adjusting the traffic-to-pilot power ratio as a function of the feedback by increasing the traffic-to-pilot power ratio as a function of bad reception feedback, and decreasing the traffic-to-pilot power ratio as a function of good reception feedback.

An exemplary mobile station comprises transceiver circuits to transmit signals to a wireless communication network, and to receive signals from the wireless communication network, and one or more processing circuits operatively associated with the transceiver circuits. Exemplary processing circuits include a power control circuit configured to control a traffic-to-pilot power ratio for a traffic channel signal transmitted by the mobile station relative to a pilot signal transmitted by the mobile station, and adjust the traffic-to-pilot power ratio responsive to the feedback received by the mobile station for the traffic channel signal. An exemplary power control circuit is configured to control a transmit power of the pilot signal responsive to power control commands received by the mobile station, such that the mobile station varies a transmit power of the traffic channel signal as a function of the received power control commands and the reception quality feedback.

In one exemplary embodiment, the present invention is embodied in a mobile station configured for use in a wireless communication network that provides Automatic Repeat Requests (ARQ), e.g., Hybrid ARQ, for data frames transmitted by the mobile station, such that the mobile station receives direct or indirect ACK/NAK feedback for each data frame that it transmits. By way of non-limiting example, the network may be configured according to IS-2000 standards, and the mobile station may adjust the power gain of a reverse link packet data channel signal relative to its reverse link pilot signal. Of course, the present invention is not limited to such embodiments, and those skilled in the art will recognize other applications, features, and advantages upon reading the following discussion, and upon viewing the accompanying figures.

DETAILED DESCRIPTION OF THE INVENTION

Figure 1:
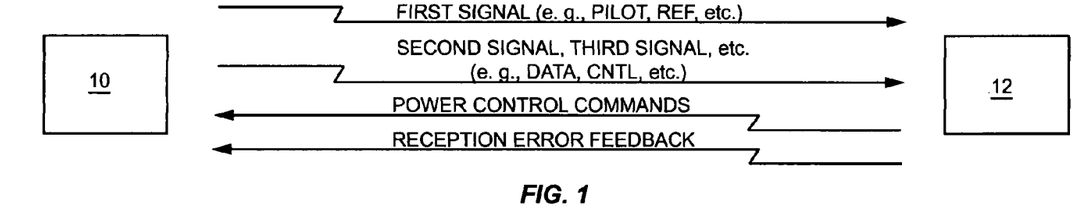
FIG. 1 is a diagram of exemplary first and second communication transceivers in accordance with the present invention.

FIG. 1 is a diagram of first and second communication transceivers 10 and 12, respectively, wherein one or both the transceivers implement exemplary data link power control in accordance with the present invention. Transceiver 10 transmits a first signal at a transmit power that is controlled by transceiver 12 based on transceiver 12 sending power control commands to transceiver 10. Transceiver 10 further transmits one or more additional signals, e.g., second and third signals, at one or more controlled power gains relative to the first signal. Thus, where transceiver 10 transmits a second signal at a controlled power gain relative to the first signal, commanded increases of the first signal's transmit power result in corresponding increases in the transmit power of the second signal and, likewise, commanded decreases of the first signal's transmit power result in corresponding decreases in the transmit power of the second signal.

According to one or more exemplary embodiments of the present invention, transceiver 10 adjusts the power gains of one or more of the additional signals, e.g., the second and/or third signals responsive to receiving received signal quality information feedback from the remote transceiver 12. By way of non-limiting example, transceiver 10 may have an initial or default power gain that it uses to establish the transmit power of the second signal relative to the transmit power of the first signal.

Assuming that transceiver 12 streams power control commands to transceiver 10 such that it dynamically adjusts the first signal's transmit power to maintain a targeted signal strength at transceiver 12, one sees that the transmit power of the second signal varies dynamically with that of the first signal according to the defined power gain. However, according to one embodiment of the present invention, transceiver 10 receives signal quality feedback, e.g., ACK/NAK data, from transceiver 12 for the second signal, and uses that feedback to adjust the power gain of the second signal relative to the first signal. Of course, the present invention extends this idea jointly or separately to one or more additional signals that may be transmitted by transceiver 10, such that the power gains of those channels are jointly or separately adjusted by transceiver 10 based on one or more indications of received signal quality returned by transceiver 12. These examples and other exemplary details are explored in more detail later herein.

Figure 2:
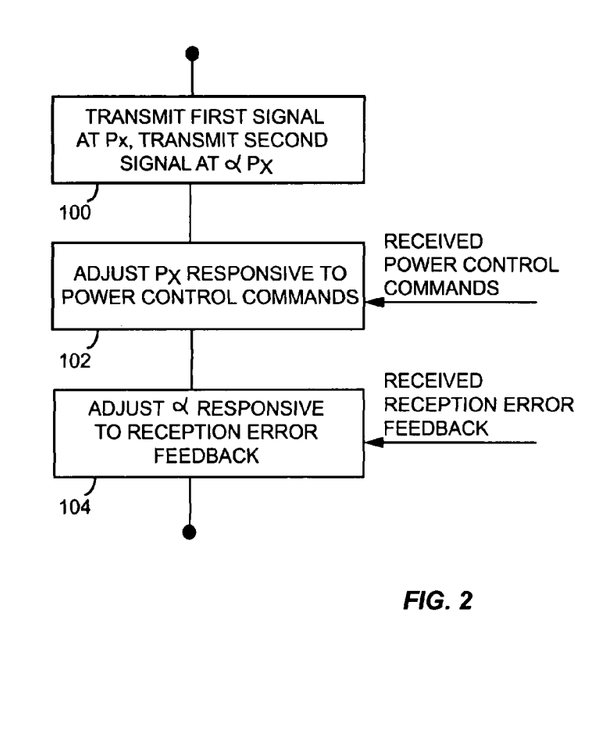
FIG. 2 is a diagram of exemplary processing at the first transceiver of FIG. 1.
Figure 3:
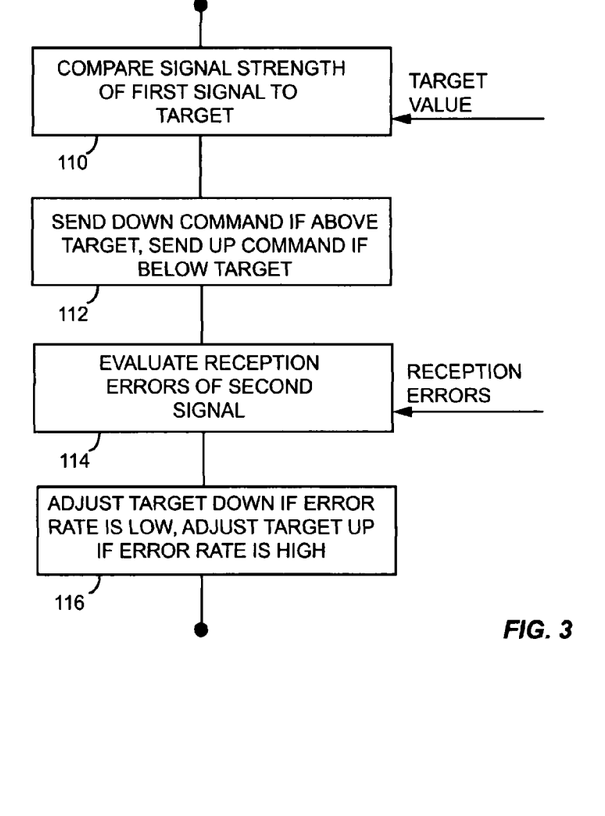
FIG. 3 is a diagram of exemplary processing at the second transceiver of FIG. 1.

FIGS. 2 and 3 illustrate exemplary processing logic at transceivers 10 and 12 in accordance with one or more exemplary embodiments of the present invention. As illustrated in FIG. 2, transceiver 10 transmits the first signal, which may be a pilot signal or other reference signal, at a transmit power $P_1$, and transmits the second signal, which may be traffic channel signal, control channel signal, or other data signal, at a transmit power $P_2 = \alpha P1$, where $\alpha$ represents a controlled power gain factor (Step 100).

Transceiver 10 receives power control commands from transceiver 12 that instruct transceiver 10 to increase or decrease the transmit power of the first signal, and transceiver 10 makes ongoing adjustments to $P_1$ responsive to these commands (Step 102). Transceiver 10 further receives reception quality feedback for the second signal, which may be in the form of Acknowledgment/Non-acknowledgement (ACK/NAK) indications transmitted by transceiver 12 based on whether it did or did not successfully receive data carried by the second signal (Step 104). In an exemplary embodiment, then, transceiver 10 adjusts the power gain factor α upward as a function of received NAKs, and adjusts it downward as a function of received ACKs.

Complementing such processing, FIG. 3 illustrates exemplary, related processing at transceiver 12. Transceiver 12 receives the first signal from transceiver 10 and compares it to a target signal strength, or evaluates the signal according to some other metric (Step 110). The target value may be based on a current data rate of the second signal, e.g., higher rates correspond to higher targets. In any case, if the received signal strength is above the target, the first signal's transmit power is needlessly high and transceiver 12 sends a "down" command to transceiver 10 (Step 112). Conversely, if the received signal strength is below the target, transceiver 12 sends an "up" command to transceiver 10 (Step 112).

After or simultaneous with such processing, transceiver 12 evaluates reception errors for the second signal as received at transceiver 12 (Step 114), and transmits corresponding reception quality feedback to transceiver 10 for the second signal (Step 116). For example, the second signal may comprise a data signal having a succession of data frames and transceiver 12 may be configured to send ACK or NAK indicators on a per frame basis depending on whether given frames are or are not successfully decoded at transceiver 12.

Figure 4:
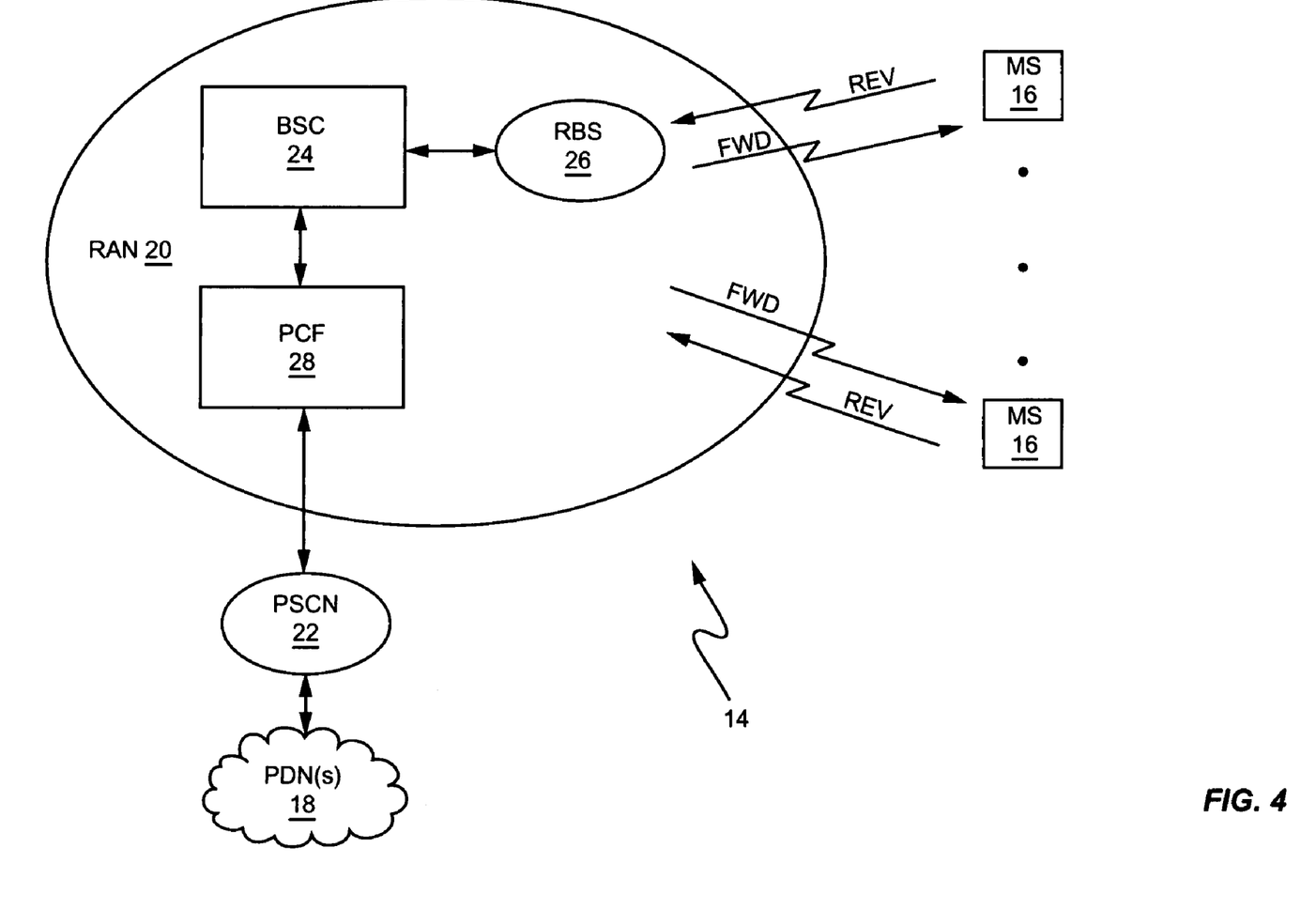
FIG. 4 is a diagram of an exemplary wireless communication network in which the present invention may be embodied.

FIG. 4 illustrates an exemplary application of the present invention in the context of a wireless communication network 14 that may be configured in accordance with any of a number of wireless communication standards, such as current or pending IS-2000 standards, Wideband CDMA (WCDMA) standards, etc. Network 14 communicatively couples a plurality of mobile stations 16 to one or more Public Data Networks (PDNs) 18, such as the Internet.

In an exemplary embodiment, network 14 comprises a Radio Access Network (RAN) 20 that is coupled to the PDN(s) 18 through a Packet Switched Core Network (PSCN) 22. RAN 20 comprises at least one Base Station (BS) that includes a Base Station Controller 24 and one or more associated Radio Base Stations (RBSs) 26. BSC 24 may include packet control interface circuits to communicate with PSCN 22, or may couple to PSCN 22 through a Packet Control Function 28. While only one BSC 24 and one RBS 26 are illustrated for clarity, it should be understood that RAN 20 may include a plurality of BSCs 24, each controlling one or more RBSs 26. Further, network 14 may include additional entities not illustrated, such as a Circuit Switched Core Network (CSCN) to communicatively couple RAN 20 to the Public Switched Telephone Network (PSTN), to the Internet, etc.

The present invention may be used in the context of either or both reverse link power control and forward link power control. For example, when applied to reverse link power control, a mobile station 16 may operate in the role of transceiver 10 and the RBS 26 may operate in the role of transceiver 12. Thus, mobile station 16 may transmit a reverse link pilot signal that is power-controlled by RBS 26, and may transmit a reverse link traffic channel signal at a controlled traffic-to-pilot power ratio. The mobile station 16 thus would adjust the traffic-to-pilot power ratio as a function of reception error feedback from one or more RBSs 26 regarding their reception of the mobile station's traffic channel signal.

Figure 5:
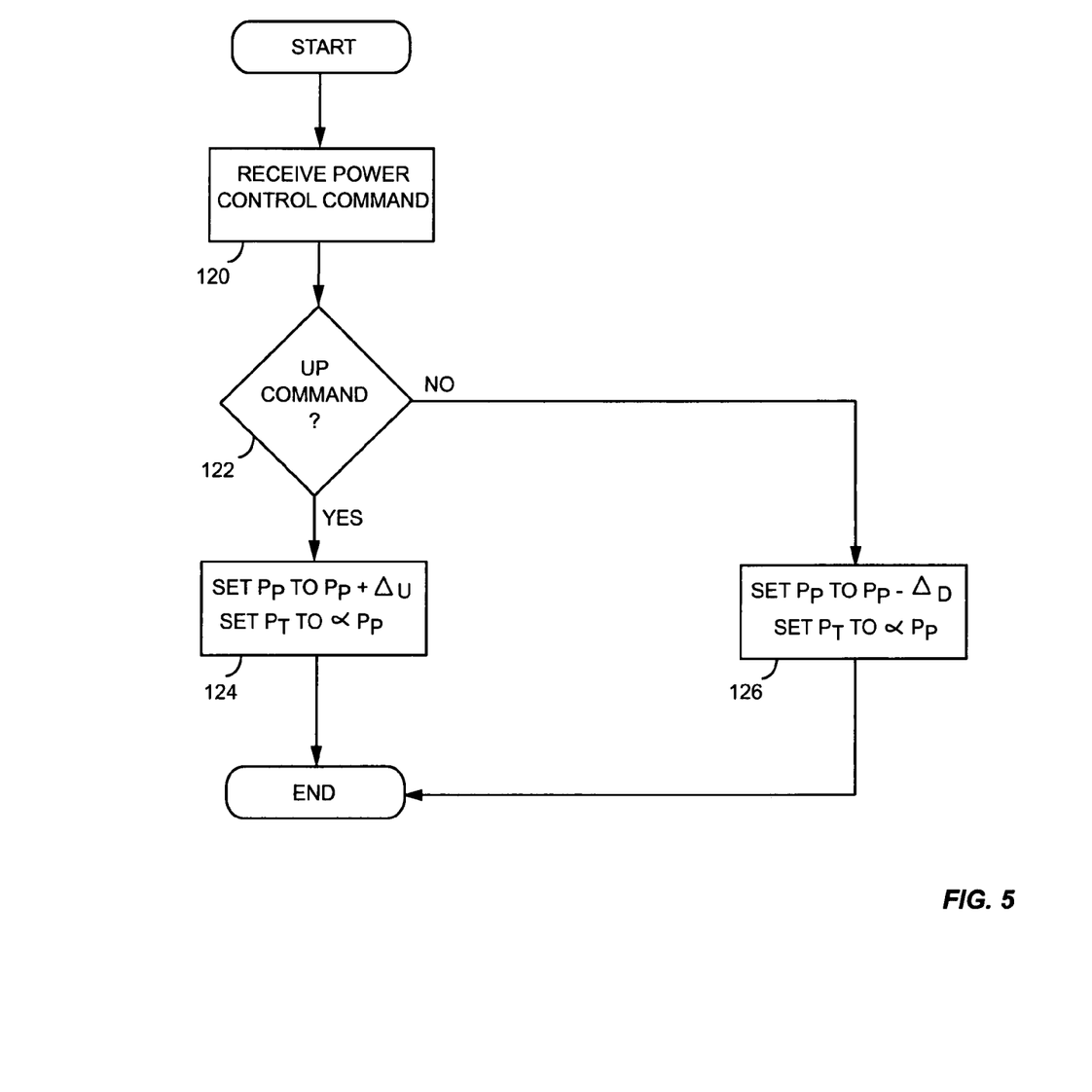
FIGS. 5 and 6 are diagrams of exemplary reverse link power control at a mobile station in accordance with one embodiment of the present invention.

The exemplary processing of FIG. 5 illustrates exemplary transmit power adjustment that may be executed by mobile station 16 responsive to each received power control command. In an IS-2000-based embodiment, RBS 26 sends power control commands, e.g., Power Control Bits (PCBs), to mobile station 16 at up to 800 Hz. Thus, mobile station 16 may adjust its transmit power as frequently as every 1.25 ms in response to incoming power control commands. Note that the commands also may be more than just up/down bit indicators, e.g., the commands may comprise multi-state indicators providing up/down/hold control, etc.

According to the exemplary processing logic, mobile station 16 receives a power control command (Step 120), and determines whether the command is an up command (Step 122). If so, mobile station 16 sets its pilot signal transmit power, $P_P$, according to the following equation in dB, $$P_P = P_P + \Delta_{UP}, \tag{1}$$

where $\Delta_{up}$ is a defined incremental step change in power, and sets its traffic channel power, $P_T$, according to the following equation, $$P_T = \alpha + P_P, \tag{2}$$

where α is the power gain factor in dB that sets the traffic-to-pilot power ratio (Step 124). (Note that the power relationship also can be expressed as $P_T = \alpha P_P$, in which case the power gain factor α provides a variable power scaling.)

Conversely, if the command is not an up command, i.e., it is a down command, mobile station 16 decreases its pilot signal transmit power according to the following equation in dB, $$P_T = P_P - \Delta_{down}, \tag{3}$$

where $\Delta_{down}$ is a defined incremental step change in power, and sets its traffic channel power according to Eq. (2) above (Step 126).

Figure 6:
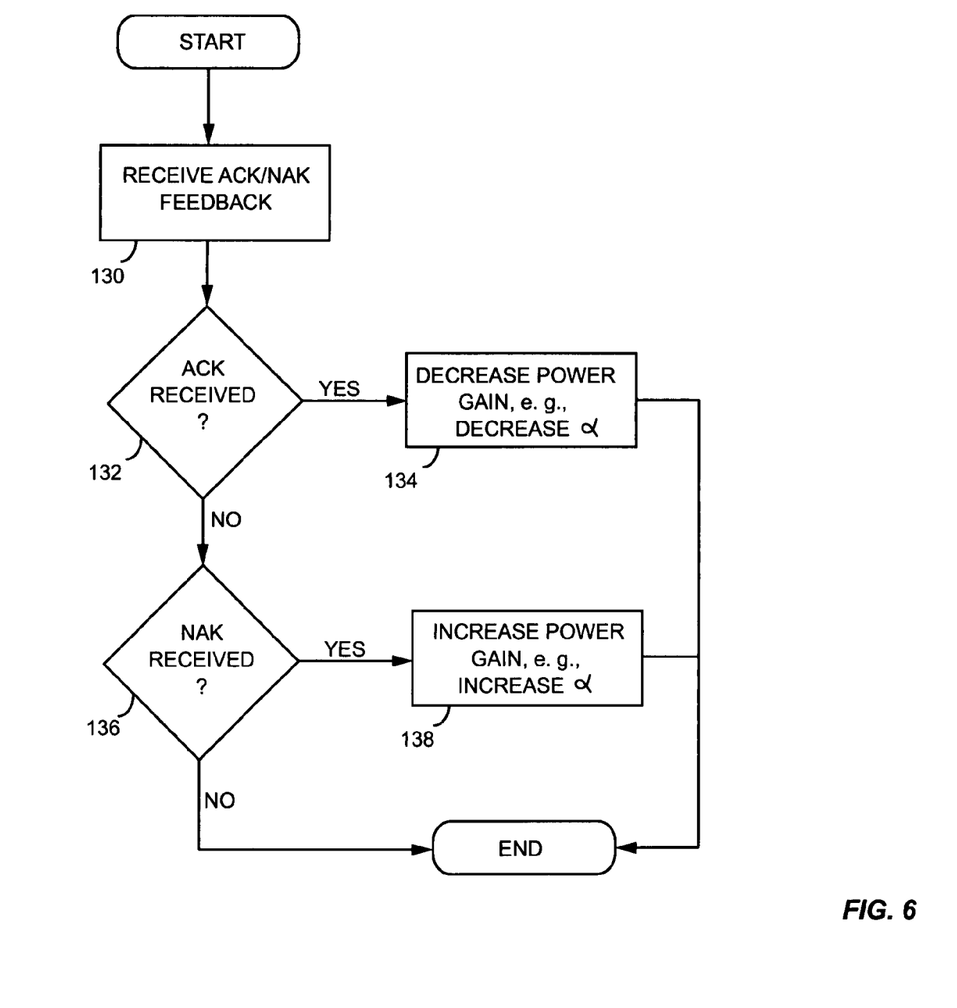

The exemplary mobile station 16 further adjusts its traffic-to-pilot power ratio responsive to reception error feedback from network 14, e.g., from one or more RBSs 26. For example, as noted above, mobile station 16 may transmit data frames on its reverse link traffic channel signal, and RBS 26 may send ARQs or send some other form of ACK/NAK feedback to mobile station 16 based on whether it received a good or bad data frame from mobile station 16. Such ACK/NAK feedback may be explicit or implicit. In one form of implicit signaling, RBS 26 provides explicit ACK or NAK indications, and the absence of such explicit indication is inferred as the opposite indicator. For example, the absence of a NAK may be inferred as an ACK or vice versa.

In any case, exemplary power gain adjustment processing at mobile station 16 begins responsive to receiving ACK/NAK feedback from network 14. The illustrated logic may be executed by mobile station 16 on a per ACK/NAK event. Thus, mobile station 16 receives ACK/NAK feedback from network 14 (Step 130), and determines whether the feedback comprises an ACK (Step 132). If an ACK is received, mobile station 16 may decrease the traffic-to-pilot power gain factor α by a defined amount in dB (Step 134). In an exemplary embodiment, mobile station 16 computes the decrease as, $$\text{Decrease} = \frac{x}{[(FER)^{-1} - 1]} \, dB \tag{4}$$

where x is a dB value. Such change may be effected by setting the power gain factor α accordingly, or may be effected in another manner as needed or desired.

If a NAK is received instead of an ACK (Step 136), the mobile station 16 may increase the traffic-to-pilot power gain α by a defined amount in dB. In an exemplary embodiment, the mobile station 16 computes the increase as, $$\text{Increase} = x \, dB, \tag{5}$$

where x may be the same value as used in Eq. (4) above (Step 138).

Thus, according to an exemplary embodiment of the present invention, the mobile station 16 may "float" its traffic channel signal at an adjustable power level above the transmit power level of the mobile station's pilot channel signal. In effect, the mobile station 16 thus implements a secondary form of outer loop control for the reverse link transmit power of the traffic channel signal, wherein it adjusts the transmit power of its data signal relative to its pilot signal, while the RBS 26 may be imposing its own reverse link power controls on the mobile station's pilot and/or data signals. Of course, such power control can be applied to any other channels transmitted at some power ratio or offset relative to the pilot signal.

It should be understood that the converse operations can be implemented at the RBS 26 in relation to forward link signals being transmitted from RBS 26 to one or more mobile stations 16. That is, RBS 26 may float the transmit power of one of a data signal of interest transmitted by it at an adjustable level above another signal that is power-controlled by one or more mobile stations 16. In this manner, the transmitting entity, be it mobile station, base station, or other type of communication transceiver, applies data link power control based on reception quality feedback from one or more remote transceivers. Such control may be secondary to any closed loop power control imposed by the remote transceivers and thus may function as secondary or supplemental data link power control.

Figure 7:
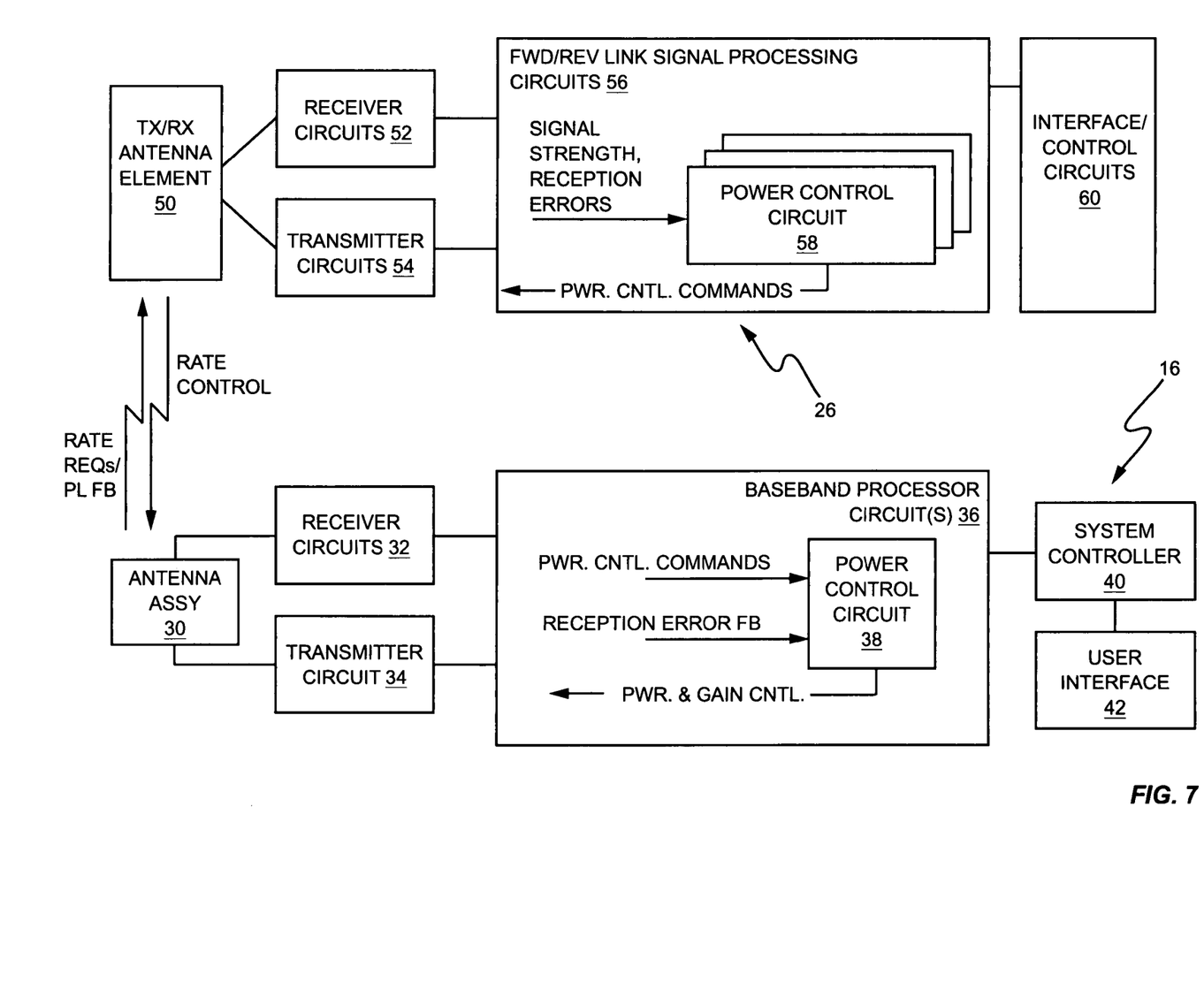
FIG. 7 is a diagram of an exemplary mobile station and an exemplary radio base station in accordance with one or more embodiments of the present invention.

By way of non-limiting examples, FIG. 7 illustrates embodiments for an exemplary mobile station 16 and for an exemplary RBS 26. Mobile station 16 comprises an antenna assembly 30, a receiver circuit 32, a transmitter circuit 34, baseband processor circuit(s) 36, including a power control circuit 38, and a system controller 40 (e.g., microcontroller) and an associated user interface 42 (e.g., keypad, display, speakers, etc.). RBS 22 comprises transmit/receive antenna elements 50, pooled receiver circuits 52, pooled transmitter circuits 54, forward/reverse link signal processing circuits 56, including one or more power control circuits 58, and interface/control circuits 60.

In mobile station 16, power control circuit 38 may be configured as part of a baseband signal processor, or as part of another microprocessor or other logic-based circuit in mobile station 16. In an exemplary embodiment, power control circuit 38 adjusts the power gain of a data signal transmitted by the mobile station 16 relative to the mobile station's pilot or other reference signal in response to ACK/NAK feedback received from a supporting wireless communication network for the data signal. Additionally, the power control circuit 38 may be configured to control the pilot and data signal transmit powers responsive to incoming power control commands received from the network. Power control circuit 38 may be implemented in hardware, in software, e.g., as a computer program stored in memory in mobile station 16, or in some combination of both. Regardless, power control circuit 38 may be operatively associated with the receiver/transmitter circuits and configured to carry out the present invention in any of its embodiments.

Similarly, the power control circuit(s) 58 may be configured to provide inner and outer reverse link power control for a plurality of mobile stations and, collectively or individually, can be configured to provide supplemental power control for one or more forward link channels of interest transmitted by RBS 26. That is, the power control circuit(s) 58 can be configured to adjust the floating power gains of one or more forward link data signals responsive to receiving relevant reception quality feedback from the one or more mobile stations 16 to which those data signals are directed. Such reception quality feedback can, of course, comprise ACK/NAK return indications but it should be understood that the present invention can use other forms of received signal quality feedback.

Further, the present invention may be applied to situations involving multiple channels, such as when multiple traffic channels coexist. For example, if a mobile station 16 is configured with simultaneous voice and packet data calls, both a fundamental channel and a packet data channel may be set up on the reverse link. In such circumstances, the receiving base station(s) may provide received signal quality feedback for the packet data channel, e.g., ACK/NAK feedback, but not for the fundamental (voice) channel. In such circumstances, the mobile station 16 may transmit the fundamental channel at a first power gain relative to its pilot channel transmit power, and transmit the packet data channel at a second power gain relative to the pilot channel transmit power.

Thus, lacking received signal quality feedback specifically for the fundamental channel, the mobile station 16 may hold that channel's power gain at a fixed ratio relative to the pilot channel transmit power according to conventional outer loop power control. However, the mobile station may float the transmit power of the packet data channel at a variable ratio by adjusting the power gain of that channel relative to the pilot channel based on the received signal quality information returned by the base station, e.g., the floating power gain may be controlled based on ACK/NAK feedback or some other feedback indicative of received signal quality at the remote receiver. Thus, the above example illustrates a scenario where a mobile station 16 transmits two channels at controlled power gains relative to its pilot signal power, but adjusts the power gain just for the channel for which it receives received signal quality feedback.

Further, the present invention may be used to adjust the power gain of other types of channels relative to each other. As an example, assume that mobile station 16 transmits a pilot signal at a given power, and transmits a second signal at some power gain relative to the pilot, and transmits a third signal at some power gain relative to the second signal such that the second signal's power anchors the third signal's power. Of course, one should note that the "second" and "third" labels are for clarity of description and that the third signal could serve as an anchor for the second, and so on for other combinations of any number of signals transmitted in addition to the pilot. In any case, with such an arrangement, the mobile station 16 dynamically adjusts its pilot power up and down responsive to incoming power control commands, and the second and third signal powers follow the pilot power adjustments according to the defined relative gains. Conventionally, the relative gains of the second and third signals would be held at fixed ratios based on the assumption of, for example, similar fading behaviors of the two signals.

However, the present invention provides more flexibility. For example, the mobile station 16 may transmit a fundamental channel signal and a packet data channel signal, e.g., a turbo coded packet data channel signal. The fundamental channel may be more prone to high Doppler spread than the turbo coded packet data channel. According to an embodiment of the present invention, then, the power ratio of packet data channel to the fundamental channel changes according to one or more reception conditions. For example, the fundamental-to-packet data channel power gain may change from x dB in AWGN channel conditions to (x+y) dB for high mobility conditions, e.g., 120 km/hr mobile speed.

Thus, the present invention provides increased performance compared to conventional power control wherein the powers of all reverse traffic channels are tied with that of the reverse pilot by a fixed ratio that can be reassigned by the base station through layer 3 messages. Usually the outer-loop power control is based on the fundamental channel FER and assumes that when the fundamental channel satisfies the performance, the specified power ratios of other traffic channels will result in meeting their FER requirements. However, as noted above, that assumption fails where one or more of the channels is more susceptible to performance degradation for given radio conditions.

In more detail, conventional outer-loop power control of multiple traffic channels is based on the frame error rate (FER) performance of one particular channel. Consequently, FERs of the other channels are dependent on the outer-loop power control of that particular channel. For example, assume one pilot channel and two traffic channels are sent from a first transceiver to a second transceiver on three orthogonal code channels and that both traffic channels are transmitted with fixed power gains relative to the pilot.

The second transceiver measures received pilot power relative to its inner-loop target and sends power control commands back to the first transceiver, commanding it to increase or decrease the pilot transmit power as needed to maintain received pilot power at the inner-loop target. The first transceiver would thus move its pilot power up and down responsive to the incoming power control commands, and correspondingly move the transmit powers up and down according to their fixed power gains relative to the pilot.

If the second transceiver, i.e., the one sending the power control commands, adjusts the inner-loop target based on the FER of the first traffic channel, then its closed loop power control of the first transceiver essentially guarantees that FER requirements of the first traffic channel will be met. Further, if the target FERs of both the first and the second traffic channels can be maintained using fixed relative power gains to the pilot under all channel conditions, then satisfying the FER requirement of the first traffic channel also satisfies that of the second. However, if the FER of the second channel cannot be maintained using a fixed power gain, then power controlling based on maintaining the target FER of the first channel does not necessarily satisfy the FER requirements of the second channel.

The exemplary transceiver overcomes the above problem by floating the transmit power of the second channel. By way of example, assume that a first exemplary transceiver transmits a pilot channel (PICH) and two traffic channels, including a fundamental channel (FCH) and a packet data channel (PDCH). The remote transceiver sends power control commands back to the first transceiver based on comparing received pilot strength to its inner loop target, and adjusts that target based on the FER of the received FCH. Further, the remote receiver sends ACK/NAK or other reception quality feedback to the first transceiver for the PDCH.

Thus, the first transceiver can transmit the FCH with a fixed power gain relative to its PICH because power control commands from the remote transceiver are keyed directly to maintaining the FER of the FCH. A fixed power gain on the PDCH would not, however, guarantee that its FER requirements were being met at the remote receiver. Thus, the first transceiver sets a floating power gain relative to the PICH (or to the FCH), and adjusts that gain up or down responsive to the reception quality feedback incoming from the remote transceiver. In this manner, the first transceiver implements a secondary or supplemental form of outer loop power control that is driven directly by the reception quality information for the floating channel. Notably, this floating power gain does not interfere with the ongoing closed loop inner and outer loop power control being carried out using the PICH and FCH channels.

Thus, while the first transceiver still follows the inner-loop power control commands on all three channels, it still can reduce the floating power gain of the PDCH relative to the PICH (or to the FCH) by a desired first amount if one or more ACKs are received and increase the PDCH gain by a desired second amount if one or more NAKs are received. The step sizes for such adjustments may be chosen based on the target FER of the PDCH. Such PDCH relative gain adjustment at the transmitter is an example of the invention. As a result, the FCH and the PDCH in this example share the same inner-loop but have separate outer-loop power controls to meet their FER requirements independently.

The present invention thus "unties" the presumed relationships between the channel powers and allows the traffic channels with ACK/NAK or other received quality feedback to "float" their power ratios to the pilot (or to another traffic channel) and adjust those ratios to satisfy their individual FER requirements independent from that of the fundamental channel or other anchor channel. One benefit of this method is that FER requirements of all traffic channels can be constantly met through dynamic adjustments in the physical layer without waiting for higher layer, delayed messages and without being dependent on incorrectly assumed performance relationships to the anchor channel.

Broadly, then, the present invention enables a receiver, e.g., a cellular radiotelephone or other wireless device, to dynamically adjust the power ratio of one or more channels relative to one or more other channels such that the device may transmit one or more "floating" signals (variable power gains) while transmitting one or more non-floating signals (fixed power gains). In an exemplary embodiment, a mobile station transmits a power-controlled signal, e.g., pilot or other reference signal, and transmit one or more additional signals, e.g., traffic signals at controlled power ratios directly or indirectly relative to the pilot signal power. These one or more ratios then are adjusted responsive to receiving signal quality feedback for them. As such, those skilled in the art should appreciate that the present invention is not limited by the foregoing discussion nor is it limited by the exemplary illustrations. Indeed, the present invention is limited only by the following claims and the reasonable equivalents thereof.

What is claimed is:

1. A method of reverse link power control at a mobile station comprising:

transmitting a pilot signal at a controlled transmit power from the mobile station to one or more remote transceivers;

transmitting one or more traffic channel signals from the mobile station at one or more power gains directly or indirectly relative to the transmit power of the pilot signal; and adjusting the power gain of one or more of the traffic channel signals responsive to receiving reception quality feedback from the one or more remote transceivers for the one or more traffic channel signals.

2. The method of claim 1, wherein transmitting one or more traffic channel signals at one or more power gains relative to the transmit power of the pilot signal comprises transmitting a first traffic channel signal at a first power gain relative to the pilot signal, and transmitting a second traffic channel signal at a second power gain relative to the first traffic channel signal.

3. The method of claim 2, further comprising setting the second power gain responsive to receiving reception quality feedback for the second traffic channel signal such that the transmit power of the second traffic channel signal relative to the transmit power of the first traffic channel signal varies as a function of the reception quality feedback received by the mobile station for the second traffic channel signal.

4. The method of claim 3, further comprising maintaining the first traffic channel at a fixed power gain relative to the pilot signal.

5. The method of claim 1, wherein adjusting the power gain of one or more of the traffic channel signals responsive to receiving reception quality feedback from one or more remote transceivers for the one or more traffic channel signals comprises receiving reception quality feedback for at least one traffic channel signal and adjusting the power gain of that traffic channel signal relative to the transmit power of the pilot signal, or relative to a transmit power of another traffic channel signal that is transmitted with a power gain relative to the transmit power of the pilot signal.

6. The method of claim 1, wherein transmitting a pilot signal at a controlled transmit power comprises adjusting a transmit power of the pilot signal responsive to power control commands received by the mobile station from one or more network base stations.

7. The method of claim 1, wherein the mobile station receives reception quality feedback for a given one of the one or more traffic channel signals as good and bad reception indicators that indicate good or bad reception by one or more network base stations.

8. The method of claim 7, wherein the mobile station adjusts the power gain of the given traffic channel signal by decreasing the power gain responsive to receiving one or more good reception indicators, and increases the power gain responsive to receiving one or more bad reception indicators.

9. The method of claim 7, wherein the good and bad reception indicators comprise ACKs and NAKs, respectively, and wherein the mobile station adjusts the power gain of the given traffic channel signal by decreasing the power gain responsive to receiving one or more ACKs and increasing the power gain responsive to receiving one or more NAKs.

10. The method of claim 9, wherein the mobile station increases the power gain for the given traffic channel signal by a first step size responsive to receiving a NAK.

11. The method of claim 10, wherein the mobile station decreases the power gain for the given traffic channel signal by a second, smaller step size responsive to receiving an ACK.

12. The method of claim 11, further comprising calculating the second step size as a function of the first step size and a Frame Error Rate (FER) determined from the ACK/NAK feedback.

13. The method of claim 1, wherein the reception quality feedback comprises one or more of ACK/NAK feedback, quality indication feedback, and erasure indication feedback.

14. A mobile station comprising:
transceiver circuits configured to transmit and receive signals to and from a wireless communication network, said signals including a pilot signal transmitted from the mobile station at a controlled transmit power and one or more traffic channel signals transmitted at one or more power gains directly or indirectly relative to the transmit power of the pilot signal; and
one or more processing circuits operatively associated with the transceiver circuits, said one or more processing circuits including a power control circuit configured to adjust the power gains of one or more of the traffic channel signals responsive to receiving reception quality feedback from one or more remote transceivers, such that relative transmit powers of one or more traffic channels transmitted by the mobile station vary as a function of receiving the reception quality feedback.

15. The mobile station of claim 14, wherein the mobile station is configured to transmit a first traffic channel signal at a first power gain relative to the pilot signal, and transmit a second traffic channel signal at a second power gain relative to the first traffic channel signal.

16. The mobile station of claim 15, wherein the mobile station is configured to set the power gain of the second traffic channel signal responsive to receiving reception error information for the second traffic channel signal such that the transmit power of the second traffic channel signal relative to the transmit power of the first traffic channel signal varies as a function of the reception quality feedback received by the mobile station for the second traffic channel signal.

17. The mobile station of claim 16, wherein the mobile station is configured to maintain the first traffic channel at a fixed power gain relative to the pilot signal.

18. The mobile station of claim 14, wherein the mobile station is configured to receive reception quality feedback for at least one traffic channel signal and adjust the power gain of that traffic channel signal relative to the transmit power of the pilot signal, or relative to a transmit power of the other traffic channel signal that is transmitted with a power gain relative to the transmit power of the pilot signal.

19. The mobile station of claim 14, wherein the mobile station is configured to adjust the transmit power of the pilot signal responsive to power control commands received by the mobile station from one or more network base stations.

20. The mobile station of claim 14, wherein the reception quality feedback comprises good and bad reception indicators, and wherein the mobile station is configured to adjust the power gain for a given traffic channel signal by decreasing the power gain responsive to receiving one or more good reception indicators and increasing the power gain responsive to receiving one or more bad reception indicators.

21. The mobile station of claim 20, wherein the mobile station is configured to increase the power gain for the given traffic channel signal by a first step size responsive to receiving a bad reception indicator.

22. The mobile station of claim 21, wherein the mobile station is configured to decrease the power gain for the given traffic channel signal by a second, smaller step size responsive to receiving a good reception indicator.

23. The mobile station of claim 22, further wherein the mobile station is configured to calculate the second step size as a function of the first step size and a Frame Error Rate (FER) determined from the reception quality feedback.

24. The mobile station of claim 22, wherein the mobile station is configured to receive the reception quality feedback as good and bad reception indicators comprising one or more of ACK/NAK indicators, quality bit indicators, and erasure bit indicators.

25. A method of data link power control at a communication transceiver comprising:
controlling a transmit power of a first signal transmitted by the communication transceiver responsive to one or more received power control commands;
transmitting a second signal at an adjustable transmit power having a power gain relative to the transmit power of the first signal;
receiving reception quality information relating to the second signal; and adjusting the power gain of the second signal responsive to the reception quality feedback.

26. The method of claim 25, wherein transmitting a second signal at an adjustable transmit power having a power gain relative to the transmit power of the first signal comprises setting its transmit power for the second signal as a function of the transmit power of first signal and the power gain, and wherein the transceiver adjusts that power gain up and down as needed responsive to receiving reception quality feedback for the second signal from a remote transceiver receiving the second signal.

27. The method of claim 25, further comprising transmitting a third signal having a power gain relative to the transmit power of the first signal, and setting the power gain of the second signal relative to the third signal.

28. The method of claim 27, wherein adjusting the power gain of the second signal responsive to the reception quality feedback comprises adjusting the power gain of the second signal relative to the first and third signals such that power ratios of the first and third signals to the second signal change as a function of reception quality feedback received for the second signal.

29. The method of claim 28, further comprising adjusting an inner-loop power control target of the first signal based on a received signal quality of the third signal.

30. The method of claim 28, wherein the first signal comprises a pilot signal, and the second and third signals comprise first and second traffic channels, respectively.

31. The method of claim 25, wherein controlling a transmit power of a first signal transmitted by the communication transceiver responsive to received power control commands comprises transmitting a pilot signal and adjusting the transmit power of the pilot signal responsive to the received power control commands, and wherein transmitting a second signal at an adjustable transmit power having a power gain relative to the transmit power of the first signal comprises transmitting a data signal at a transmit power determined by the transmit power of the pilot signal and the power gain.

32. The method of claim 31, wherein receiving reception quality feedback relating to the second signal comprises receiving good and bad reception indicators that indicate whether a remote transceiver correctly received data carried by the data signal.

33. The method of claim 32, wherein receiving good and bad reception indicators that indicate whether a remote transceiver correctly received data carried by the data signal comprises receiving ACK/NAK indications from the remote transceiver for each frame of the data signal, and wherein adjusting the power gain of the second signal relative to the first signal responsive to the reception quality feedback comprises increasing the power gain by a first amount responsive to receiving a NAK and decreasing the power gain by a second amount responsive to receiving an ACK.

34. The method of claim 25, wherein the communication transceiver comprises a mobile station, the first signal comprises a pilot signal, and the second signal comprises a traffic channel signal, and wherein controlling a transmit power of a first signal transmitted by the communication receiver responsive to received power control commands comprises controlling the transmit power of the pilot signal responsive to power control commands transmitted to the mobile station by one or more network base stations.

35. The method of claim 34, wherein transmitting a second signal at a controlled power gain relative to the first signal comprises transmitting data frames on the traffic channel signal, and wherein receiving reception quality feedback relating to the second signal comprises receiving reception quality feedback from one or more network base stations on a per frame basis.

36. The method of claim 35, wherein the reception quality feedback comprises ACK/NAK indicator feedback, and wherein adjusting the power gain of the second signal relative to the first signal responsive to the reception quality feedback comprises increasing the power gain as a function of receiving NAK indications and decreasing the power gain as a function of receiving ACK indications.

37. The method of claim 25, wherein the communication transceiver comprises a network base station in a wireless communication network.

38. The method of claim 25, wherein receiving reception quality feedback relating to the second signal comprises receiving one or more ACK/NAK feedback, quality indicator feedback, and erasure feedback.

39. A communication transceiver comprising:
transceiver circuits to transmit and receive signals to and from one or more remote transceivers; and
one or more processing circuits operatively associated with the transceiver circuits, said one or more processing circuits including a power control circuit configured to:
control a transmit power of a first signal transmitted by the communication transceiver responsive to power control commands received by the communication transceiver;
control a power gain of a second signal transmitted by the communication transceiver directly or indirectly relative to the transmit power of the first signal; and
adjust the power gain of the second signal responsive to the reception quality feedback received by the communication transceiver for the second signal.

40. The communication transceiver of claim 39, wherein the communication transceiver transmits a third signal having a power gain relative to the transmit power of the first signal, and wherein the communication transceiver is configured to set the power gain of the second signal relative to the third signal.

41. The communication transceiver of claim 40, wherein the communication transceiver is configured to adjust the power gain of the second signal responsive to the reception quality feedback by adjusting the power gain of the second signal relative to the first and third signals such that power ratios of the first and third signals to the second signal change as a function of reception quality feedback received for the second signal.

42. The communication transceiver of claim 41, wherein the communication transceiver is configured to adjust an inner-loop power control target of the first signal based on a received signal quality of the third signal.

43. The communication transceiver of claim 41, wherein the first signal comprises a pilot signal, and the second and third signals comprise first and second traffic channels, respectively.

44. The communication transceiver of claim 39, wherein the first signal comprises a pilot signal, and wherein the power control circuit is configured to adjust the transmit power of the pilot signal responsive to the power control commands.

45. The communication transceiver of claim 44, wherein the second signal comprises a data signal, and wherein the power control circuit is configured to control the power gain of the data signal relative to the pilot, such that a transmit power of the data signal depends on the transmit power of the pilot signal and the power gain.

46. The communication transceiver of claim 45, wherein the power control circuit is configured to adjust the power gain of the second signal relative to the first signal responsive to the reception quality feedback received by the communication transceiver for the second signal by receiving good and bad reception indicators indicating whether a remote transceiver correctly received data carried by the data signal.

47. The communication transceiver of claim 46, wherein the power control circuit is configured to increase the power gain by a first amount responsive to receiving a bad reception indicator and decrease the power gain by a second amount responsive to receiving a good reception indication.

48. The communication transceiver of claim 46, wherein the communication transceiver is configured to receive good and bad reception indicators as one or more of ACK/NAK feedback, quality indication feedback, and erasure indicator feedback.

49. The communication transceiver of claim 39, wherein the communication transceiver comprises a mobile station, and wherein the first signal comprises a pilot signal and the second signal comprises a traffic channel signal.

50. The communication transceiver of claim 49, wherein the mobile station is configured to transmit data frames on the traffic channel signal, and is configured to receive the power control commands and the reception quality feedback from one or more base stations of a wireless communication network that are supporting the mobile station.

51. The communication transceiver of claim 50, wherein the reception quality feedback comprises ACK/NAK feedback, and wherein the power control circuit is configured to increase the power gain of the traffic channel signal relative to the pilot signal by retransmitting a data frame for which a NAK was received by the mobile station according to a desired retry protocol, and increasing the power gain if the retransmission is unsuccessful.

52. The communication transceiver of claim 39, wherein the reception quality feedback comprises ACK/NAK feedback, and wherein the power control circuit is configured to increase the power gain as a function of receiving NAK indications and decrease the power gain as a function of receiving ACK indications.

* * * * *